Patented Aug. 13, 1929.

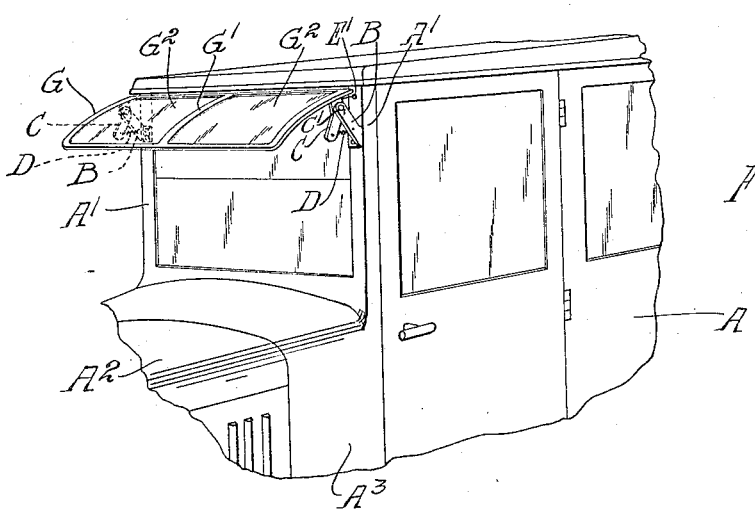
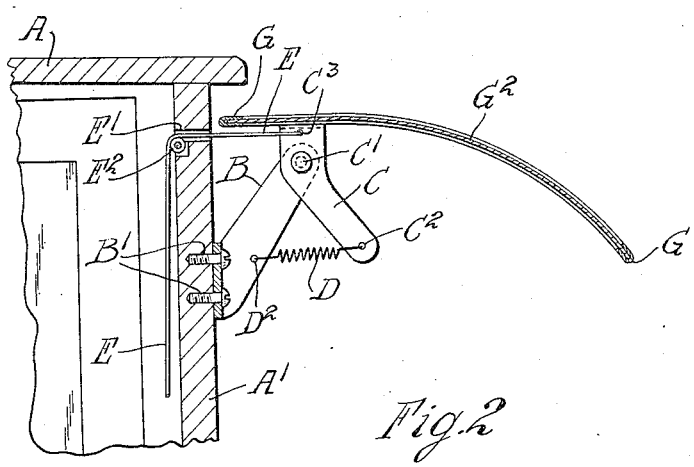
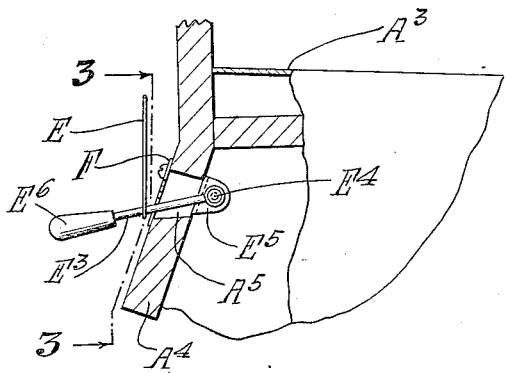
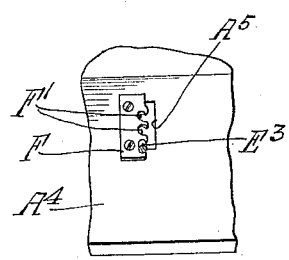
Fig.1
Fig.2
Fig.3
Inventor
Arthur R. Simon
by Parker & Carter
Attorneys.

1,724,433

UNITED STATES PATENT OFFICE.

ARTHUR R. SIMON, OF LA PORTE, INDIANA.

VISOR.

Application filed October 7, 1925. Serial No. 60,980.

This invention relates to an automobile visor and particularly to a visor adapted to be mounted at the front of the automobile body or top and to extend forwardly and downwardly therefrom. It has for one object to provide an adjustable means whereby the inclination and position of the visor may be readily adjusted from the inside. Another object is to provide a means for doing this which may be used in connection with closed automobiles having extremely narrow front posts and in which it is therefore important to provide a very small controlling device which may pass through a small opening. Other objects will appear from time to time throughout the specification and claim.

My invention is illustrated more or less diagrammatically in the accompanying drawings, wherein:

Figure 1 is a partial perspective view of a closed automobile body when the visor is in position;

Figure 2 is a vertical longitudinal cross section on an enlarged scale with parts broken away;

Figure 3 is a sectional view taken on line 3—3 of Figure 2.

Like parts are indicated by like characters throughout.

A is the body of an automobile which is not described in detail as its particular features form no part of the invention. It has a corner post or member $A^1$ at each front corner of the body. $A^2$ is the hood of the automobile, $A^3$ cowl and $A^4$ is a dash board within the body.

B is a bracket or supporting member fastened by means of screws $B^1$ to the corner post or member $A^1$. Bolts or rivets might be substituted for the screws and the bracket member may thus be fastened to the corner post in any suitable manner.

C is a lever pivoted at $C^1$ on the bracket member B. D is a spring preferably as shown a helical coil spring fastened at one end in a perforation $C^2$ of the lever C and fastened at the other end in a perforation $D^2$ of the bracket member B. The lever C is perforated as at $C^3$ and in this perforation is fastened a wire cable or chain E. This cable passes through a perforation $E^1$ in the post $A^1$ over an anti-friction roller $E^2$ and downward to a controlling handle $E^3$ to which it is attached. The handle is pivoted at $E^4$ in a fitting $E^5$ fastened to the dash board $A^4$ and extends through a perforation or slot $A^5$ in the dash board. At its outer end the handle carries a handle member $E^6$.

F is a locking or controlling plate fastened to the dash board $A^4$, provided with notches $F^1$ and extending partially across the opening or slot $A^5$ in the dash board $A^4$.

G is the visor frame and as shown it is generally rectangular in plan and provided with a central or reinforcing member $G^1$ and having one or more plates $G^2$. These plates may be of translucent material such as celluloid, mica and the like or any material suitable for this purpose or they may be opaque and the construction of the visor itself may be slightly changed as its details form no part of the invention. It is sufficient for the purpose of this invention that a visor is used and that the visor is attached to the adjusting mechanism above described in detail. The visor frame G is fastened at each end to or supported upon the levers C and it is adjusted by their adjustment.

Although I have shown an operative device, still it will be obvious that many changes might be made in size, shape and arrangement of parts without departing materially from the spirit of my invention; and I wish, therefore that my showing be taken as in a sense diagrammatic. In particular many different forms of devices might be used for pulling in the cable and generally speaking for tilting the levers which carry the visor and I do not wish therefore to be limited to the specific form shown.

The lever C of the spring D may be omitted from one side and the visor. Thus the entire control mechanism will be on one side, preferably the left, and the entire device may be operated by one hand of the operator, without the necessity of stopping or getting out of the car. Any suitable means for adjusting the tension of the spring D may be used. The anti-friction roller $E^2$ might be omitted and the wire or cable run through a smooth tube, and any other suitable arrangement for passing the cable or wire into the body may be used.

The use and operation of my invention are as follows:

With the parts as shown the visor will be held in the position indicated, the spring tending always to draw the visor farther down and this tendency being resisted by the cable or wire. The visor will thus be held in fixed position.

When it is desired to lower the visor, it is sufficient merely to operate the controlling handle to permit the cable to be pulled out slightly in response to tension of the spring. The levers will thus be rotated downwardly about their pivot points carrying the visor with them and so tilting the visor downwardly from the position shown.

When it is desired to raise the visor the operating handle is manipulated so as to draw in the cable in opposition to the tension of the spring so that the carrying levers are tilted upwardly and the visor itself raised. This operation is, of course, carried out without the necessity of opening any of the windows of the automobile and the control is thus possible wholly from the interior, by the use of one hand.

Where the lever and spring and other adjusting features appear only on one side of the visor, the operation differs from that described above in that there is only one cable and it is this cable alone which is moved to adjust the position of the visor.

I claim:

A visor structure adapted to be mounted on a vehicle body and comprising in combination a bracket mounted exteriorly of the vehicle, a supporting member for carrying the visor pivoted intermediate its ends on the free end of said bracket, means between said bracket and one end of said supporting member for biasing the latter to a predetermined position, a flexible member connected at one end to the other end of said supporting member, said supporting member being arranged to swing about its pivot in opposition to said biasing means and said flexible connection leading through an opening formed in the upper portion of the vehicle body, a locking device supported within the vehicle body, and a single actuating device connected to the opposite end of said flexible connection and arranged to engage said locking device whereby, by a single operation, the visor is adjusted and secured in its adjusted position.

Signed at La Porte, county of La Porte and State of Indiana.

ARTHUR R. SIMON.